United States Patent [19]

Nguyen et al.

[11] Patent Number: 4,789,038

[45] Date of Patent: Dec. 6, 1988

[54] AXLE WEIGHT DISTRIBUTION CONTROLLER

[75] Inventors: Phong T. Nguyen, Lacey; Charles L. Keith, Seattle; Jerry L. McCauley, Kent, all of Wash.

[73] Assignee: Structural Instrumentation, Inc., Tukwila, Wash.

[21] Appl. No.: 24,994

[22] Filed: Mar. 12, 1987

[51] Int. Cl.$^4$ ............................................. B62D 61/12
[52] U.S. Cl. .................................. 180/24.02; 180/209
[58] Field of Search ............... 280/704, 680, 682, 104; 180/24.02, 209, 290

[56] References Cited

U.S. PATENT DOCUMENTS

| | | | |
|---|---|---|---|
| 3,094,341 | 6/1963 | Alfieri | 180/24.02 |
| 3,257,124 | 6/1966 | Mendez | 180/24.02 |
| 3,494,632 | 2/1970 | Bostrom | 180/24.02 |
| 3,499,663 | 3/1970 | Hedlund et al. | 280/704 |
| 4,284,156 | 8/1981 | Carstensen | 180/24.02 |

*Primary Examiner*—John J. Love
*Assistant Examiner*—Karin L. Ferriter
*Attorney, Agent, or Firm*—Seed and Berry

[57] ABSTRACT

An axle weight distribution controller for maintaining the weight borne by the steering axle of a load-carrying vehicle. A load transducer attached to the steering axle produces an electrical signal that is compared with signals representing desired minimum and maximum loads to be borne by the steering axle. If the load borne by the steering axle falls outside of the predetermined load interval, the pressure in an air spring supporting a third axle is adjusted so as to redistribute the weight borne by each of the other axles in the vehicle and to bring the load borne by the steering axle within desired limits.

14 Claims, 2 Drawing Sheets

AXLE WEIGHT DISTRIBUTION CONTROLLER

DESCRIPTION

1. Technical Field

This invention relates to an apparatus for controlling the distribution of the weight of a load on a vehicle, and more particularly, to an apparatus for maintaining the load borne by a first vehicular axle by varying the load borne by a second vehicular axle.

2. Background Art

Multi-axle load transporting vehicles, especially commercial trucks, are capable of carrying a wide range of cargos. As a result, the loads borne by each axle of a multi-axle vehicle can, without further control, encompass a considerable range. Typically, local political authorities (such as states, counties, and cities) regulate the maximum per-axle weight allowed to be borne by commercial vehicles using their roads. Operators, on the other hand interested in maximizing the utilization of their vehicles, commonly wish to approach these imposed axle load limits as closely as possible. Depending upon the weight distribution of the load being carried, attempts to maximize the load without exceeding the per-axle weight limit can cause the load borne by the vehicle's forward, or steering, axle to be greater than the load which the driver wishes to have for ease of steering.

It is known in the prior art to add an auxiliary axle, supported by an adjustable air spring, to a multiaxle vehicle for the purpose of relieving and distributing the load borne by the vehicle's other axles. Depending upon the placement of this auxiliary axle, a variety of load redistribution schemes are possible. For example, placing the air-assisted axle closer to the rear axles then to the front axle increases the weight borne by the front axle as the pressure in the air-assisted axle is increased.

In some embodiments, controls for varying the air shock inflation pressure are retained within the driver's compartment. In these cases, it is possible for a driver to adjust the air pressure in the air shocks in order to first meet the per-axle loading requirements at a truck-weighing scale and to later reduce the load borne by the steering axle in order to decrease steering effort. These adjustments can potentially increase the load borne by the other axles beyond the legal limits.

To make such operator control less convenient, in some applications, the air pressure control can be removed from the driver's compartment. In this case, although the vehicle may meet all per-axle load limits when fully loaded, as the load in the vehicle is decreased, the load borne by the steering axle reduces to the level where the steering axle has a tendency to hydroplane on wet pavements. This condition can lead to the loss of steering control of the vehicle.

Accordingly, it is desirable to develop an air axle control system capable of adjusting the pressure in an air shock-assisted axle in order to maintain the load borne by a steering axle between predetermined minimum and maximum levels.

DISCLOSURE OF THE INVENTION

It is an object of the present invention to provide an air axle control apparatus capable of automatically maintaining the load borne by a steering axle between predetermined minimum and maximum limits.

It is another object of the present invention to provide an apparatus for adjusting the load borne by the steering axle of a vehicle in order to maximize the load that can be carried by such vehicle without exceeding legal load limits.

It is yet another object of the present invention to provide an apparatus for automatically controlling the load borne by the steering axle of a vehicle in order to optimally distribute the load borne by the axles of the vehicle.

In general, these and other objects of the present invention are accomplished by an apparatus for use on a multi-axle vehicle having a steering axle, the apparatus comprising a transducer adapted to produce a first signal representing the load borne by the steering axle, an electrical circuit adapted to receive the first signal and to produce a second signal in response thereto, and a third axle located between the steering axle and the other vehicle axles, the third axle being positionable in response to the second signal in order to vary the load borne by the steering axle, in order that the load borne by the steering axle is maintained between predetermined minimum and maximum loads.

BEST MODE FOR CARRYING OUT THE INVENTION

Figure 1:
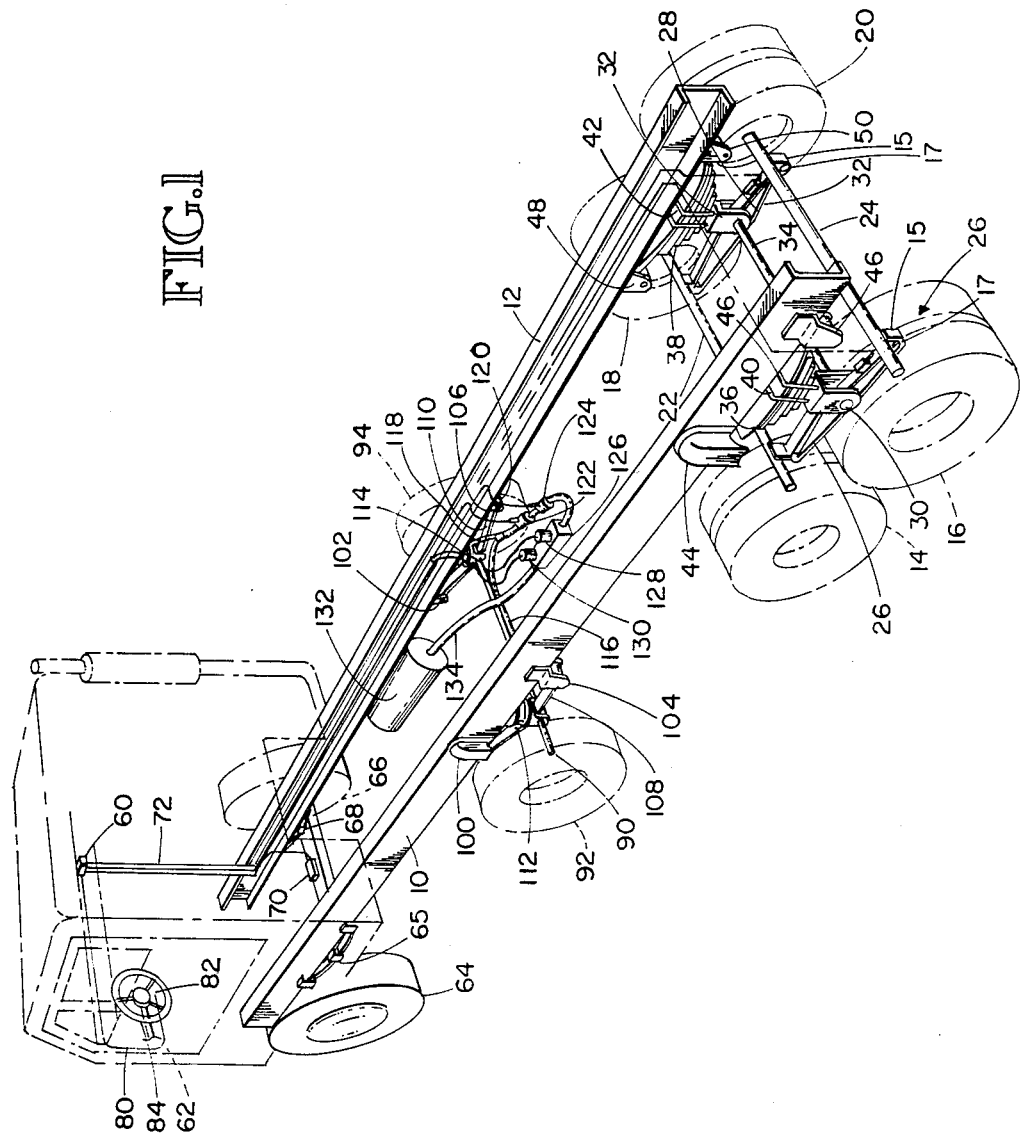
FIG. 1 is an isometric view of one embodiment of the present invention installed on a typical multi-axle vehicle.

The axle weight distribution controller of the present invention is shown, in FIG. 1, installed on a vehicle having a pair of cross-connected longitudinal chassis frame members 10, 12 carried at the rear of the vehicle. The members are carried by a tandem-axle suspension system, including fore and aft axle assemblies 22, 24 having sets 14, 16 and 18, 20, of dual wheels mounted on opposite ends thereof. The axle assemblies have forked, depending hangar brackets 15 fixed at their ends and pivotally connected at 17 in straddling relation to eyes formed at the ends of a pair of equalizing beams 26, 28 in the manner shown in U.S. Pat. No. 2,914,349. At their longitudinal center, these equalizing beams support a pair of saddles 30, 32 mounted on the ends of a cross tube 34 in the manner shown in U.S. Pat. No. 3,129,016. Also as shown in this latter patent, pairs of U-bolts 40, 42 hold a pair of multi-leaf spring units 36, 38 seated on the flat upper face of the saddles, and these springs are, in turn, connected by front and rear spring hangers 44, 48 and 46, 50 to the chassis frame members. A typical such equalizing beam suspension system also includes front and rear torque rod assemblies (not shown) connected to the chassis frame and mounted on the center of the tandem axles as disclosed in the aforesaid patents. Those skilled in the art will readily recognize that the frame members can also be supported by a single-axle suspension system, depending upon the load the vehicle can be expected to carry.

The forward portions of the chassis frame members are supported by a steerable front wheels 64, 66. These wheels are connected to a dead front axle 68 which is suspended by leaf spring units 65. A strain measuring transducer 70 is secured to the front axle for producing electrical indications of the bending thereof. A pair of leads 72 carry these electrical signals to the load indicator 60, located in the driver's compartment of cab 62.

The transducer can be mounted to the front axle in accordance with the procedure set forth in U.S. Pat. No. 4,042,049.

Indicator 60 is also connected via cable 80 to ignition switch 82, located near steering wheel 84. Upon activating the ignition switch to supply electrical power to the engine of the vehicle, electrical power is also supplied to the indicator and other associated circuitry of the present invention.

An axle 90 is positioned between the front (or steering) axle supporting the front ends of the chassis frame members and the rear fore and aft axle assemblies. In one embodiment, axle 90 can be placed approximately one-third of the distance from the front axle to the rear axle assemblies. Wheels 92 and 94 are mounted at the two ends of axle 90. Attached to the two frame members 10, 12 are front and rear spring hangers 100, 102 and 104, 106. These spring hangers respectively support the front and rear ends of leaf springs 108 and 110. Axle 90 is attached to the underside of the center of leaf springs 108 and 110. Air springs 112 and 114 are placed between the upper central point of springs 108 and 110, respectively. The lower end of each of the air springs 112, 114 rests on the upper surface of the leaf springs 108, 110, respectively, while the upper end of the air springs 112, 114 ride against the lower surface of the frame members 10, 12, respectively.

By adjusting the air pressure in the air springs 112, 114, the separation of the centers of the leaf springs 108, 110 can be varied. When the air springs 112, 114 are uninflated, the leaf springs 108, 110 are shaped and located so that wheels 92 and 94 do not touch the ground upon which the vehicle is riding.

Air springs 112, 114 can be inflated through air hoses 116 nd 118, respectively. These hoses can be supplied with air pressure from air line 120 which, in turn, is serially connected to pressure switches 122 and 124 and air valve 126. Air valve 126 contains air bleed valve 128 and air fill valve 130. Valve 126 is also connected to air tank 132 by hose 134. The air tank can be repressurized by a conventional compressor carried by the vehicle (not shown).

In operation, the air springs can be maintained at a pressure in the range of 2-4 pounds per square inch (psi). At a pressure of 2 psi, the air springs act against the leaf springs, but not sufficiently to cause wheels 92 and 94 to touch the ground. On the other hand, at a pressure of 4 psi, the air springs act against the leaf springs sufficiently to cause wheels 92 and 94 to be capable of supporting a load in excess of the maximum expected load limits. In some states (e.g., Oregon), it is required that all wheels must be touching the road. In these states, the air springs can be adjusted so that the wheels are forced against the road with some relatively small force, e.g., 200 pounds.

The load borne by wheels 92 and 94 on axle 90 affects, of course, the loads borne by the rear axles 22, 24 and the front axle 68. In the embodiment shown, as the pressure in the air springs 112, 114 is increased, the load supported by the rear axles 22, 24 increases, thereby necessarily decreasing the load borne by the front axle 68. The placement of air spring-supported axle 90 affects the redistribution of the load borne by the vehicle as the pressure in the air springs is increased.

In states where it is necessary to maintain the air axle's wheel on the road, a high (or bleed) pressure switch 122 may be used. The pressure switch 122 is an electrical switch for sensing the pressure in air valve 126. The bleed pressure switch 122 is a normally open switch whose contacts are closed if the pressure inside line 120 exceeds some predetermined value, such as 4 psi. Fill pressure switch 124 is a normally open electrical switch whose contacts close if the pressure inside air hose 120 falls below a second predetermined value, such as 2 psi. Electrical signals produced by these pressure switches 122, 124 are processed by circuitry co-located with indicator 60. While the details of such circuitry will be explained subsequently, it is sufficient at this point to recognize that the circuitry sends electrical signals to the air shock bleed and fill valves 128 and 130.

In accordance with a signal received from the electrical circuit colocated with indicator 60, bleed valve 128 causes pressure within air valve 126 to be relieved until bleed pressure switch 122 opens, indicating that the pressure in the air valve has fallen below 4 psi. Fill valve 130, on the other hand, upon receiving an appropriate electrical signal from the electrical circuitry, opens, causing the pressure in the air valve to increase. The fill pressure switch remains closed until the pressure in the air valve exceeds 2 psi.

Figure 2:
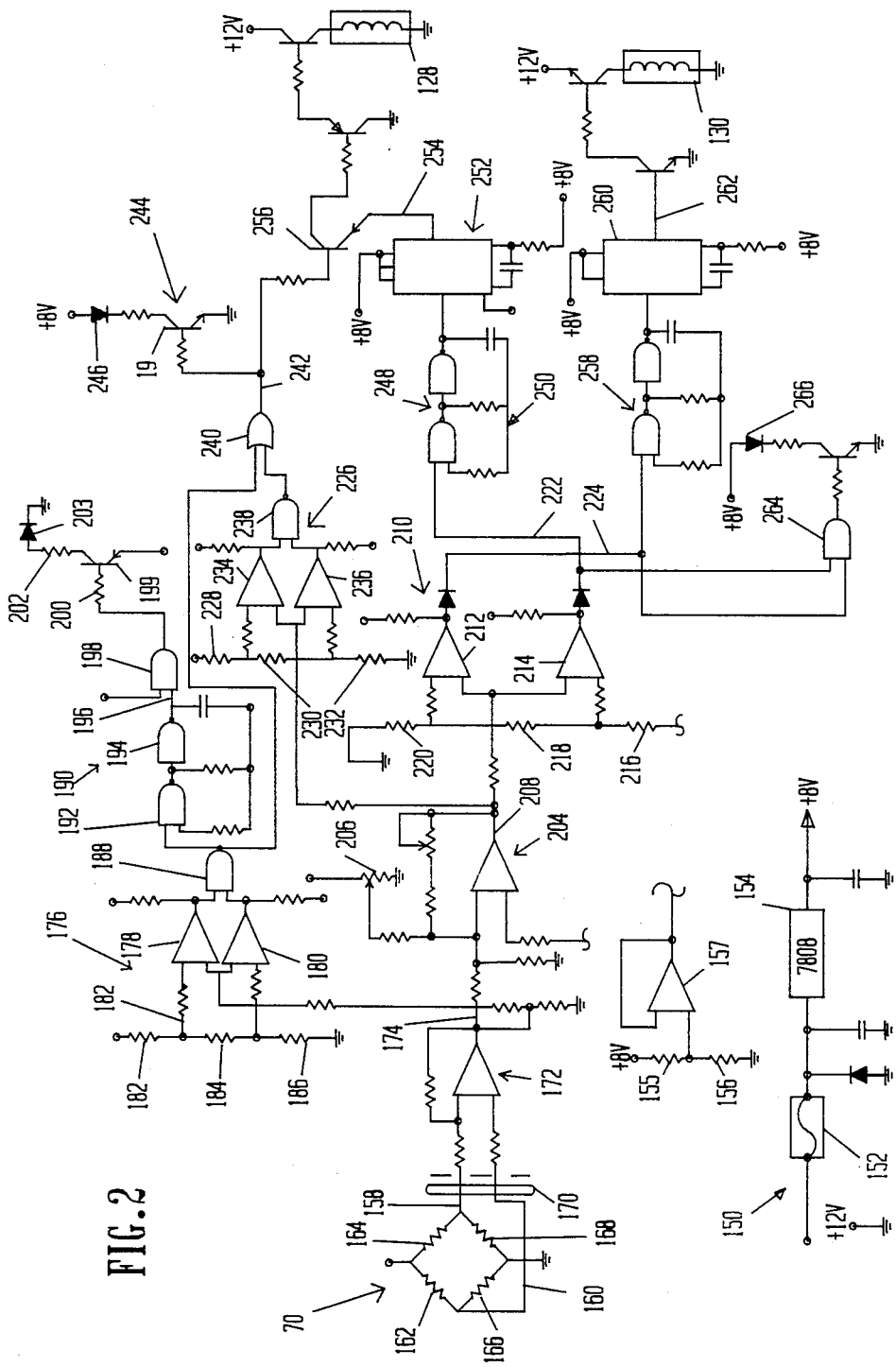
FIG. 2 is a schematic diagram of an electrical circuit used in the apparatus of the present invention.

Referring now to FIG. 2, the electrical circuitry co-located with indicator 60 is activated upon the application of a highly regulated direct current (DC) supply voltage, for example, 8 volts, to appropriate points in the circuit. This supply voltage is produced by circuit 150, comprising fuse 152 and conventional converter/regulator 154. The converter can be an integrated circuit, such as a 7808 circuit, connected to the vehicle's 12 volt electrical supply to produce a highly regulated 8 volt supply. This 8 volt supply can be furnished through voltage divider resistor 155, 156 to operational amplifier 157, connected as a voltage follower, to produce a reference voltage, $V_{ref}$, which may be 4 volts. This reference voltage is applied to appropriate points in the circuit shown in FIG. 2.

Transducer 70, attached to the front axle, comprises a Wheatstone bridge operative to produce a signal that measures at the strain and, accordingly, the load placed on the front axle. The transducer's output is a voltage appearing between lines 158 and 160. When the transducer is balanced, the voltages on lines 158 and 160 are equal. Resistances 162-168 are chosen so that, when balanced, they satisfy the relation $R_{162} R_{164} = R_{166} R_{168}$. Any imbalance in the resistances of the Wheatstone bridge of transducer 70, resulting from strains in the front axle, cause a voltage difference between lines 158 and 160. These signals are carried in cable 170 to the circuitry shown to the right of dashed line. This circuitry is colocated with indicator 60. The signal on cable 170 is received by preamplifier 172 (for example, an LT1001, made by Linear Technology Company) which simultaneously boosts the difference signal (of the order of a few millivolts) by a factor of approximately 100, to produce a voltage of the order of tenths of a volt on line 174. The voltage on this line is therefore proportional to the load on the front axle.

The circuitry of FIG. 2 accomplishes several purposes. One purpose is to serve as an indicator that electrical power is served to the device. Another purpose is to provide an indication when either the transducer or cable are faulty. The circuitry also provides an indication when the load borne by the front axle is witin specified limits and regulates the pressure in the air spring to maintain the load within these limits. The load signal on line 174 is received by circuit 176 which consists of two comparators 178-180 and a source of comparison voltage generated by resistors 182-186. These resistors 182-186 serve as a voltage divider circuit, operating on the regulated 8 volt DC voltage, to define voltages which are acceptable upper and lower limit voltages to indicate that an appropriate signal is being produced on line 174. Therefore, comparator 178 compares the voltage on line 174 with the upper limit indicated voltage on line 182, producing a logical high voltage whenever the upper limit voltage exceeds the load signal voltage. Likewise, comparator 108 compares the low signal voltage to the lower limit voltage defined by resistances 182-186 and produces a high only when the load signal voltage exceeds the lower limit voltage.

NAND-gate 188 receives the voltages from the two comparators and produces a low voltage only if the voltage in 174 is within specified limits. Otherwise, the NAND-gate 188 produces a high or logic "1." If a low is produced by the NAND-gate 188, oscillator circuit 190, consisting of NAND-gates 192 and 194 and associated components, outputs a high on line 196. Otherwise, oscillator 190 oscillates at approximately a one Hertz rate.

AND-gate 198, enabled by the supply voltage, applies the output of oscillator circuit 190 to the base of transistor 199 through resistor 201, thereby alternately turning on transistor 199. When transistor 199 is turned on, it draws current through resistor 202 and a red LED 203. The red LED 203 will, accordingly, be held on constantly when the voltage on line 174 is within the acceptable range defined by the circuitry consisting of resistors 182-186. The red LED 203 will flash at a one Hertz rate if the voltage on line 174 is outside the acceptable range defined by the circuitry consisting of resistors 182-186.

The signal on line 174 is also received by circuit 204, which serves the purpose of comparing the voltage reference to set point voltage. This set point voltage is determined by the setting of potentiometer 206, which is connected to the 8 volt supply voltage. By this circuitry, the set point can be adjusted so that when the difference between the load voltage signal and the set point signal voltage is equal to the voltage reference, the output on line 208 is four volts. Any deviation of the voltage on line 174 from the desired set point then produces a proportional voltage on line 208. The voltage on line 208 is transmitted to circuit 210 which consists of comparators 212-214 and a voltage divider circuit made from resistors 216-220. The voltage divider is connected between the reference voltage (4 volts) and ground, and defines a voltage range corresponding to a 200-400 pound "window" within which it is desired to maintain the voltage on line 208. Therefore, the voltage on line 222 is high whenever the voltage on line 208 (i.e., the deviation of load signal 174 from the desired set point) is below the upper limit of the weight window defined by resistors 216-220. Likewise, the voltage on line 224 is high whenever the deviation voltage on line 208 is above the 200 pound lower limit of the weight window.

In a similar fashion, circuit 226 compares the voltage on line 208 to a window defined by a voltage divider consisting of resistors 228-232. If the voltages produced by comparators 234 and 236 are both high, NAND-gate 238 will produce a low voltage. A low signal at this point indicates that the voltage on line 208 is within acceptable limits. Otherwise, the voltage produced by NAND-gate 238 is high.

OR-gate 240, receiving the voltages produced by NAND-gate 188 and NAND-gate 238, produces a high voltage on line 242 whenever either (a) transducer 70 or cable 170 are faulty or (b) the deviation of the voltage on line 174 from the set point voltage falls outside acceptable limits. In other words, the voltage on line 242 is high whenever the transducer or cable are faulty or the axle load is above or below limits. When the voltage on line 242 is high, the resulting high voltage on the gate of transistor 244 causes yellow LED 246 to be lit, providing a visual indication of the failure.

Circuit 248 (consisting of oscillator 250 and time delay circuit 252 which may be one-half of a one-shot circuit in a 4598 chip) produces a constant voltage on line 254. This voltage serves as a supply voltage to transistor 256 and, when the voltage on line 242 is high, turns off transistor 256, causing air spraying bleed valve 128 to be left in the normally open position, allowing the pressure in air valve 126 to reduce.

If, on the other hand, the voltage on line 224 is high, indicating that the load borne by the front axle is below that defined by the lower limit of the window defined by resistors 216-220, it will be desirable to activate fill valve 130. This is accomplished by the high voltage on line 224 being received by oscillator 258 (producing a voltage which oscillates in the range of 2-5 kHz) and this voltage being passed through debounce circuit 260 (one-half of a 4598 chip) to produce an appropriate control voltage on line 262.

Finally, whenever voltages on line 222 and 224 are both high, indicating that the voltage on line 208 is below the upper limit and below the lower limit, the output of AND-gate 264 will be high. This voltage causes green LED 266 to light and provide a visual indication that the load on the front axle is within safe limits.

From the foregoing description, it will be readily appreciated by those skilled in the art that the axle weight distribution controller of the present invention is particularly easy to use. It can operate independently of other transducers and/or circuitry. Further, once it has been adjusted for a position with a particular vehicle, the controller will operate automatically thereafter.

The embodiments of the invention in which particular property or privilege is claimed are defined in the claims as follows.

We claim:

1. An axle load distribution controller for use on a vehicle having first and second load-bearing axles, said second axle defining an axis, said axles being spaced apart in a direction perpendicular to said axis, said load distribution controller being operative to maintain the load borne by said first axle between predetermined minimum and maximum loads, said load distribution controller comprising:

a transducer adapted to produce a first signal representing the load borne by said first axle;

an electrical circuit receiving said first signal and producing a second signal in response thereto, said second signal having a first value if the load borne by said first axle is greater than said predetermined maximum load, a second value if the load borne by said first axle is less than said predetermined minimum load and a third value if the load borne by said first axle is between said predetermined minimum and maximum loads;

a third load-bearing axle located between said first and second axles; and an actuator receiving said second signal and connected to said third load-bearing axle, for biasing said third axle so as to change the load borne by said third axle in response to said second signal.

2. The load distribution controller of claim 1 wherein said electrical circuit comprises adjustable means to designate said predetermined minimum and maximum loads.

3. The load distribution controller of claim 1 wherein said actuator biases said third axle by pneumatic pressure.

4. The load distribution controller of claim 3 wherein said electrical circuit comprises means for detecting a failure in the actuator.

5. The load distribution controller of claim 1 wherein said actuator reduces the load borne by said third axle if the load borne by the first axle is less than said predetermined minimum load.

6. The load distribution controller of claim 1 wherein said actuator increases the load borne by said third axle if the load borne by the first axle is greater than said predetermined maximum load.

7. A vehicle, comprising:
 a longitudinal frame adapted to carry a load;
 first and second load-bearing axles supporting said frame, said axles being spaced apart in the longitudinal direction;
 a transducer adapted to produce a first signal representing the load borne by said first axle;
 an electrical circuit adapted to receive the first signal and to produce a second signal in response thereto, said second signal having a first value if the load borne by said first axle is greater than a predetermined maximum load, a second value if the load borne by said first axle is less than a predetermined minimum load, and a third value if the load borne by said first axle is between said predetermined minimum and maximum loads; and
 a third axle located between said first and second axles in the longitudinal direction, said third axle being positionable by pneumatic pressure in response to said second signal, so as to vary the load borne by said third axle, in order that the load borne by said first axle is maintained between predetermined minimum and maximum loads.

8. The vehicle of claim 7 wherein said third axle is relatively closer to said second axle than to said first axle.

9. The vehicle of claim 7, further including a fourth load-bearing axle located between said second and third axles in the longitudinal direction.

10. The vehicle of claim 7 wherein said electrical circuit comprises adjustable means to designate said predetermined minimum and maximum loads.

11. The vehicle of claim 7 wherein said third axle is positioned by a pneumatic actuator responsive to said second signal.

12. The vehicle of claim 11 wherein said electrical circuit comprises means for detecting a failure in said pneumatic actuator.

13. A vehicle, comprising:
 a longitudinal frame adapted to carry a load;
 a forward load-bearing steering axle;
 at least one rear load-bearing axle;
 a transducer adapted to produce a first signal representing the load borne by said steering axle;
 an electrical circuit adapted to receive the first signal and to produce a second signal in response thereto, said second signal having a first value if the load borne by said first axle is greater than a predetermined maximum load, a second value if the load borne by said first axle is less than a predetermined minimum load, and a third value if the load borne by said first axle is between said predetermined minimum and maximum loads; and
 a positionable axle located between said steering axle and said at least one rear load-bearing axle, said axle being located relatively closer to said at least one rear load-bearing axle than to said steering axle and being positionable by pneumatic pressure in response to said second signal, so as to vary the load borne by said at least one rear load-bearing axle, in order that the load borne by said steering axle is maintained between predetermined minimum and maximum loads.

14. The vehicle of claim 13 wherein said electrical circuit comprises adjustable means to designate said predetermined minimum and maximum loads.

* * * * *

UNITED STATES PATENT AND TRADEMARK OFFICE
CERTIFICATE OF CORRECTION

PATENT NO. : 4,789,038

DATED : December 6, 1988

INVENTOR(S) : Phong T. Nguyen; Charles L. Keith; Jerry L. McCauley

It is certified that error appears in the above-identified patent and that said Letters Patent is hereby corrected as shown below:

In claim 11, column 8, line 13, delete "positioned" and substitute therefor --positionable--.

Signed and Sealed this

Sixth Day of June, 1989

Attest:

DONALD J. QUIGG

Attesting Officer

Commissioner of Patents and Trademarks